United States Patent [19]

Miyamoto

[11] 4,384,407
[45] May 24, 1983

[54] THREE DIMENSIONAL COORDINATE MEASURING APPARATUS

[75] Inventor: Kozo Miyamoto, Misato, Japan

[73] Assignee: Kosaka Laboratory Ltd., Tokyo, Japan

[21] Appl. No.: 297,505

[22] Filed: Aug. 28, 1981

[30] Foreign Application Priority Data

Sep. 2, 1980 [JP] Japan ................................. 55-120622

[51] Int. Cl.³ ............................................. G01B 7/28
[52] U.S. Cl. ............................... 33/174 P; 33/1 MP; 33/1 M
[58] Field of Search ................ 33/174 P, 174 L, 1 N, 33/1 MP, 1 PT, 1 M, 23 R, 23 K, 23 G

[56] References Cited

U.S. PATENT DOCUMENTS 3,795,054  3/1974  Kinney ............................. 33/174 L
3,944,798  3/1976  Eaton ............................... 33/1 M X Primary Examiner—Harry N. Haroian
Attorney, Agent, or Firm—Cushman, Darby & Cushman

[57] ABSTRACT

This invention discloses a three dimensional including contour tracing means such as an orthogonal coordinate mechanism and a polar coordinate mechanism having a probe which can trace the contour of a thing defined by a section, a processing means for processing the data gained by tracing operation of the probe following the contour to generate coordinate components of points on the contour in an orthogonal coordinates system one coordinate axis of which is normal to the section, a detecting means which is adapted to detect if the probe goes outside of the area defined between two planes which are set at the opposite sides of and parallel to the section, and an alarm means which gives an alarm (sound, light or other) when the detecting means detects that the probe has gone beyond the above area, the tow planes being spaced from the section a predetermined tolerance. The operator can obtain accurate coordinates of points on the contour only by moving the probe along the contour with the alarm means not operating.

5 Claims, 4 Drawing Figures

THREE DIMENSIONAL COORDINATE MEASURING APPARATUS

BACKGROUND OF THE INVENTION

This invention relates to a three dimensional coordinate measuring apparatus which is for example to determine the location of a point on a three dimensional thing or a contour of the same.

There are two kinds of three dimensional coordinate measuring apparatuses. One kind includes an orthogonal coordinate mechanism having a probe and three movable elements, the first element being movable in a direction of the X coordinate axis of an orthogonal coordinate system defined in the measuring apparatus, the second element being movable in the direction of the Y coordinate axis, the third element being moveable in the direction of the Z coordinate axis so that the probe can be moved in any direction in the three dimensional space by the combination of the movements of the above three movable elements to detect the location of a point on a three dimensional thing or to trace a contour of the same. In this kind of apparatus, scales are provided along the coordinate axes, so that the coordinate components of points on a thing detected or traced by the probe are directly measured by the respective scales. Most of the three dimensional coordinate measuring devices are of this kind.

The other kind of measuring apparatus includes a polar coordinate mechanism. FIG. 1 shows the construction principle of the polar coordinate mechanism. As shown, the mechanism includes rigid rods $R_1$, $R_2$, $R_3$, $R_4$, connecting members $P_1$, $P_2$, $P_3$, Q connecting the rods articulatedly and angle measuring means for measuring angles between the adjacent rods so that the distance and direction of the tip $P_0$ of the rod $R_4$, which acts as a probe, with respect to the fixed end of the rod $R_1$ is determined based on the lengths $l_1$, $l_2$, $l_3$, $l_4$ and the angles $\alpha$, $\beta$, $\delta$, $\theta$. The measuring apparatus includes a processing unit and the coordinate components of the location of the tip of the rod $R_4$ in a predetermined orthogonal coordinate system are determined based on the distance and direction of the tip $P_0$ by the processing unit.

The most advantageous feature of the measuring apparatus with the polar coordinate mechanism is that the polar coordinate mechanism includes a plurality of articulations so that the tip of the rod $R_4$ can approach a desired point on a thing to be measured from any direction, whereby the apparatus can easily effect the measurement, even one which is difficult or impossible for the measuring apparatus with the orthogonal coordinate mechanism.

On the contrary, in measuring the contour of a thing defined by a section parallel to a plane including two coordinate axes of the coordinate system defined in the apparatus, for example, the X-Z plane with the measuring apparatus having the orthogonal coordinate mechanism the probe can be made to be movable only in a plane including the section by fixing the element movable in the Y coordinate axis direction of the orthogonal coordinate mechanism at the location of the section in the Y coordinate axis direction, in the measuring apparatus having the polar coordinate mechanism, it is impossible to restrain the movement of the probe in the Y coordinate axis direction as in the above mentioned apparatus, so that it is quite difficult for the operator to manually move the probe following the contour with accuracy and thus the measured coordinates with respect to the contour contain errors which exceed an allowable value. Further, when a contour of a thing defined by a section which is not parallel to a plane including two coordinate axes of the coordinate system is measured, the same problem occurs in the apparatus with the orthogonal coordinate mechanism as well as the other type apparatus. In the prior art, to dissolve such problem, marking-off along the contour or attaching a narrow and elongated tape on the contour is effected to guide a probe prior to the measurement and the operator must always observe the coordinate components concerning the contour generated by the apparatus during the measurement. Accordingly, it requires quite much time and labor.

SUMMARY OF THE INVENTION

An object of this invention is to provide a three dimensional coordinate measuring apparatus which can measure coordinate components of points on the contour with less error than a predetermined allowable value and with less time and labor.

In accordance with the invention, a three dimensional coordinate measuring apparatus includes a contour tracing means such as an orthogonal coordinate mechanism and a polar coordinate mechanism having a probe which can trace a contour of a thing defined by a section, a processing means for processing the data gained by tracing operation of the probe following the contour to generate coordinate components of points on the contour in an orthogonal coordinate system one coordinate axis of which is normal to the section, a detecting means which is adapted to detect if the probe goes outside of the area defined between two planes which are set at the opposite sides of and parallel to the section, and an alarm means which raises an alarm (sound, light, . . . ) When the detecting means detects that the probe goes outside of the above area the two planes being spaced from the section a predetermined allowable error distance. The alarming means may give an alarm by preventing the movement of the probe in the coordinate axis direction normal to the section defining the contour. The operator can obtain accurate coordinates of points on the contour only by moving the probe along the contour preventing said alarming means from operating.

BRIEF DESCRIPTION OF THE DRAWINGS

The foregoing and other object, features and advantages of the invention will be apparent from the following more detailed description of preferred embodiments of the invention, as illustrated in the accompanying drawings, in which.

DETAILED DESCRIPTION OF THE INVENTION

Figure 2:
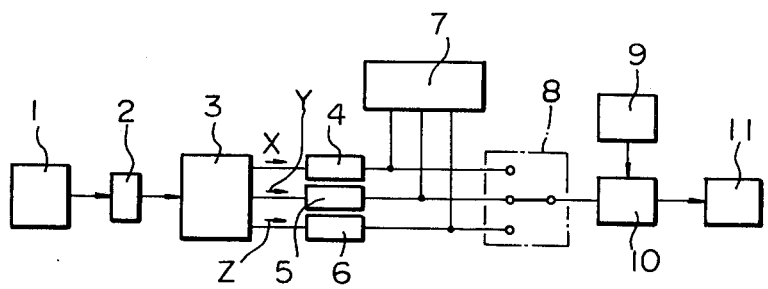
FIG. 2 shows a block diagram of a system of a three dimensional coordinate measuring apparatus of the invention.

With reference to FIG. 2, there is shown a block diagram of a system of a three dimensional coordinate measuring apparatus of this invention. Reference numerals 1, 2, 3, 4, 5, 6 and 7 designate contour tracing means, a signal counter, processing means, X coordinate component output terminal, Y coordinate component output terminal, Z coordinate component output terminal and output displaying means, respectively. The contour tracing means is such orthogonal coordinate mechanism or polar coordinate mechanism as stated above and has a probe which can trace the contour of a three dimensional thing. The counter 2 counts the signals with respect to the location of the probe which are delivered from the tracing means 1. The processing means 3 processes the data from the counter 2 to determine, X, Y and Z coordinate components of the location of the probe and to deliver the signals representing these components to the output terminals 4, 5 and 6. While the output can be taken out from each of terminals 4, 5 and 6, in the system shown in FIG. 2 the output is displayed by the displaying means 7. The system consisting of the means 1-7 has been used in prior art three dimensional coordinate measuring apparatuses.

The three dimensional coordinate measuring apparatus of this invention further comprises a switch 8, upper and lower limit setting means 9, a comparator 10 and an alarm means 11. The switch 8 selectively connects one of the terminals 4-6 to comparator 10. The comparator compares the coordinate component X, Y or Z delivered from the connected terminal with the upper and lower limit values given by the means 9 so that, when the value of the coordinate component goes beyond the upper or lower limit value, the comparator makes the alarm means give an alarm (sound, light or other).

Figure 1:
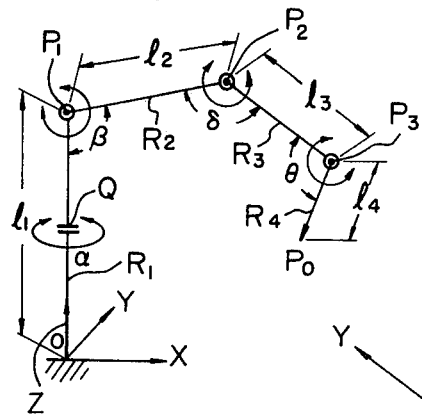
FIG. 1 shows the construction principle of a polar coordinate mechanism used in a prior art three dimensional coordinate measuring apparatus.
Figure 3:
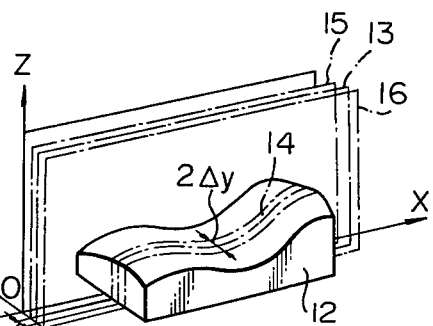
FIG. 3 is a view for explanation of a manner of measuring a contour of a three dimensional thing defined by a section which is parallel to a Z-X plane of the coordinate system appropriate to the apparatus of the invention.

For example, when a polar coordinate mechanism as shown in FIG. 1 is used as the tracing means 1 to measure the contour 14 of a three dimensional thing 12 defined by a section or a plane 13 which is apart from the X-Z plane of the orthogonal coordinate system of the apparatus of this invention in parallel with the latter plane a distance Y=a, the apparatus is operated as follows. The switch 8 is set to connect the comparator 10 and the terminal 5 which delivers the coordinate component Y of the location of the probe of the polar coordinate mechanism 1. The upper and lower limit setting means is adjusted to set the upper and lower limit value of Y=a+Δy and Y=a−Δy in which Δy is an allowable error value. The operator moves the probe along the contour 14 within the area defined by the two planes 15 and 16 which are respectively defined by Y coordinate components of Y=a−Δy and Y=a+Δy. If the probe moves outside of the above area and the alarm means gives an alarm, the operator moves the probe back into the area, whereby the operator can obtain necessary coordinate components of the points on the contour and can measure the contour accurately. Preferably, the limit which the probe goes beyond is distinguished by a different signal such as sound, light, etc. The alarm means 11 may give an alarm by preventing the movement of the probe when the probe is moved to the upper limit or lower limit.

Likewise, when the contour of the thing 12 defined by a section coincident with or parallel to the X-Y plane or the Y-Z plane, the switch 8 is switched to connect the terminal 6 or 4 with the comparator 10 and the upper and lower limit setting means 9 is adjusted to set upper and lower limits of Z or Y coordinate components.

The foregoing explains the measurement of the contour of a thing defined by a section coincident with or parallel to X-Y, Y-Z or Z-X plane of the coordinate system appropriate to the three dimensional measuring apparatus. In the following the measurement of the contour defined by a section which is not coincident with or not parallel to any of X-Y, Y-Z and Z-X planes is explained.

Many of the latest three dimensional coordinate measuring apparatuses are provided with a highly developed processing unit which functions to transform the coordinate system and, in order to obtain coordinate components of a point on a three dimensional thing in a coordinate system which is defined with respect to the thing in a design or a production process thereof, it is not required to make the coordinate system of the thing conform with that of the three dimensional coordinate measuring apparatus.

Figure 4:
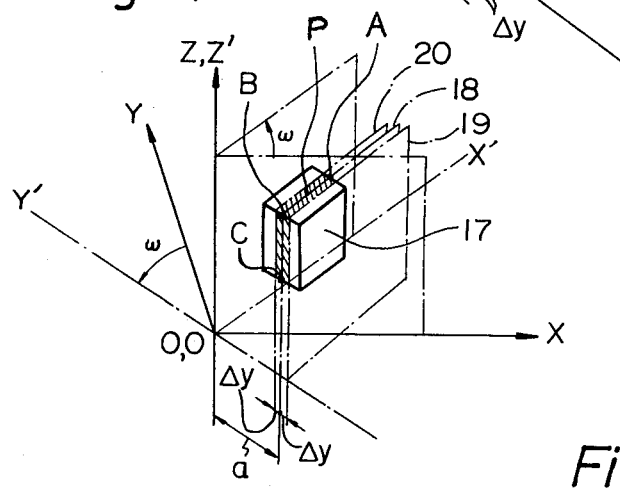
FIG. 4 is a view for explanation of a manner of measuring a contour of a thing defined by a section which is not parallel to any of X-Y, Y-Z and Z-X planes of the coordinate system of the apparatus of the invention.

The apparatus of this invention utilizes the function of transformation of coordinate system stated above in order to measure the contour defined by a section which does not coincide with and is not parallel to any of X-Y, Y-Z and Z-X planes of the coordinate system of the apparatus. This measurement will be explained with reference to FIG. 4. When the contour of a thing 17 defined by a section or a plane 18 which is not parallel to any of the X-Y, Y-Z and Z-X planes of the coordinate system of the apparatus, first the location of three points A, B and C in the plane 18 is measured, so that the orientation of the plane 18 is determined. Then, a second coordinate system having axes X', Y' and Z' one of which is normal to the plane 18 is determined. To make the explanation brief, in this example, the second coordinate system is set so that the origin O' and the axis Z' coincide with the origin O and the axis Z of the coordinate system of the apparatus consisting of axes X, Y and Z. If the Y' axis is apart from the Y axis at angle ω, coordinate components x', y', z' of an arbitrary point P on a thing in the second coordinate system is determined from the following equations.

$$x' = x \cos \omega + y \sin \omega$$

$$y' = y \cos \omega - y \sin \omega$$

$$z' = z$$

Therefore, if the above equations are set in the processing means 3, the means can process the data x, y and z of the location of a point P on the thing 17 measured by the probe based on the coordinate system of the apparatus to generate transformed coordinate components x', y' and z'. Thus, if the plane 18 is defined by Y'=a and an allowable error value is Δy, the setting means 9 sets the upper limit value of Y'=a+Δy and the lower limit value Y'=a−Δy. Therefore, the operator moves the probe on the thing within the area defined by two planes 19 and 20 which are respectively defined by Y' coordinate components of Y'=a+Δy and Y'=a−Δy and, if the alarm means gives an alarm, the operator moves the probe back into the area, whereby the operator can obtain necessary coordinate components of the points on the contour and can measure the contour accurately.

Though in the foregoing, it has been explained that the apparatus of this invention is used to measure the contour of a thing, it might be apparent that the apparatus can be used to effect marking-off on a thing by proving a marking-off pin in the tracing means instead of the probe.

What is claimed is:

1. A three dimensional coordinate measuring apparatus including: a contour tracing means such as an orthogonal coordinate mechanism and a polar coordinate mechanism having a probe which can trace the contour of a thing defined by a section; a processing means for processing the data derived from the tracing operation of the probe following the contour to generate coordinate components of points on the contour in an orthogonal coordinate system one coordinate axis of which is normal to said section; a detecting means which is adapted to detect if the probe goes outside of the area defined between two planes which are set at the opposite sides of and parallel to said section, and an alarm means which gives an alarm (sound, light, or other) when said detecting means detects that the probe goes outside of said area, said two planes being spaced from said section a predetermined tolerance.

2. A three dimensional coordinate measuring apparatus in accordance with claim 1 in which said contour tracing means has a coordinate system appropriate to the tracing means, said processing means functions to transform the coordinate system so that the processing means can transform the coordinate components of the points on the contour which have been measured by the tracing means and defined based on the coordinate system of the tracing means into coordinate components based on said coordinate system one coordinate axis of which is normal to said section, and said detecting means comprises means for setting the positions of said two planes by determining the coordinate components of the two planes in the direction of said one axis defined just above, and a comparator which compares the coordinate components of the two planes and the coordinate component of the probe in the direction of said one axis so that, when the latter coordinate component goes outside of the area between the coordinate components of said two planes, the comparator activates the alarm means.

3. A three dimensional coordinate measuring apparatus in accordance with claim 1 in which said detecting means comprises means for setting the positions of said two planes by determining the coordinate components of the two planes in the direction of the coordinate axis normal to said section and a comparator which compares said coordinate components of the two planes and the coordinate component of the probe in the direction of the coordinate axis normal to the section so that, when the latter coordinate component goes outside of the area between the coordinate components of said two planes, the comparator activates the alarm means.

4. A three dimensional coordinate measuring apparatus in accordance with claim 3 in which said contour tracing means comprises a polar coordinate mechanism having a plurality of rigid rods, connecting members for connecting the rods successively and articulatedly, and angle measuring means for measuring the angles between the adjacent rods, one end rod of said rods being fixed, the tip of the other end rod serving as said probe, said processing means being adapted to determine the location of said tip based on said angles and the lengths of said rods.

5. A three dimensional coordinate measuring apparatus in accordance with claim 4 in which said alarm means gives an alarm by preventing the movement of the probe in the direction normal to said section.

* * * * *